United States Patent [19]

Jourquin et al.

[11] Patent Number: 4,895,878
[45] Date of Patent: Jan. 23, 1990

[54] FLEXIBLE POLYURETHANE FOAM HAVING A HIGH FIRE RESISTANCE

[75] Inventors: Lucien Jourquin, Wetteren; Eddie Du Prez, Sint-Maria-Oudenhove, both of Belgium

[73] Assignee: Recticel, Brussells, Belgium

[21] Appl. No.: 246,395

[22] Filed: Sep. 19, 1988

[30] Foreign Application Priority Data

Sep. 18, 1987 [BE] Belgium .............................. 8701053

[51] Int. Cl.$^4$ ............................................. C08G 18/14
[52] U.S. Cl. .................................... 521/103; 521/107; 521/108; 521/114; 521/120; 521/123; 521/127; 521/128; 521/129; 521/906
[58] Field of Search ............... 521/103, 107, 108, 114, 521/120, 123, 127, 128, 129, 906

[56] References Cited

U.S. PATENT DOCUMENTS 4,774,268  9/1988  Marx et al. .......................... 521/128

*Primary Examiner*—Maurice J. Welsh
*Attorney, Agent, or Firm*—Sughrue, Mion, Zinn, Macpeak & Seas

[57] ABSTRACT

A flexible highly elastical polyurethane foam having a density ranging between 25 and 150 kg/m$^3$ and a relatively high fire resistance obtained by the reaction of an isocyanate and/or a chemically modified derivate thereof with a highly molecular reactive polyol in presence of a catalytic agent, of a cross-linker, and/or an extender, of water as blast means and of a fire retardant, characterized in that said fire retardant comprises at least one of the following components: (1) linear urea-formol oligomer mixture having the general formula $NH_2$—CO—NH—[$CH_2$—NH—CO—NH]$_n$—CH$_2$—NH—CO—NH$_2$, wherein n can have the value from 0 to 50; (2) urea in powdered form of which the particles are at least partially recovered by a less soluble film, as well as sulfur as of a resin; (3) dicyandiamide having the general formula:

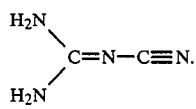

25 Claims, No Drawings

FLEXIBLE POLYURETHANE FOAM HAVING A HIGH FIRE RESISTANCE

The invention relates to a flexible highly elastical polyurethane foam having a density ranging between 25 and 150 kg/m$^3$ and a relatively high fire resistance obtained by the reaction of an isocyanate and/or a chemically modified derivate thereof with a highly molecular reactive polyol in presence of a catalytic agent, of a cross-linker, and/or an extender, of water of blast means and of a fire retardant.

In the context of the present invention "flexible highly elastical polyurethane foam" means, a polyurethane foam which is known by the skilled man as "High Resilient Foam", "HR foam", "Cold cure Foam", or foams which are technically equivalent therewith, with exclusion of the conventional generally less elastically polyurethane foams.

Usually with highly resilient foam formulation a highly molecular reactive polyol signifies a polyol with a molecular weight which is generally comprised between 4000 and 10,000 and preferably between 4500 and 6500, which orginates via polyaddition of propylene oxide and ethylene oxide on polyfunctional initator molecules and of which the content of primary OH final groups with respect to the total amount of primary and secundary OH final groups is larger than 60%, and is preferably comprised between 70 and 95%. That polyol can either or not comprise organically filling material. Further a high resilient foam formulation can comprise a surfactant, of which the foam stabilization capacity is less than the one of the silicone surfactants (polydimethylsiloxane-polyethers copolymers) which are used for the so called conventional polyether foams.

In some cases the use of such surfactants is not necessary.

By the manufacturing of those conventional polyether foams use is generally made of polyols having a high content on secundary OH groups, with a molecular weight between 2800 and 4000 and a hydroxyl number between 40 and 60.

Further by those polyurethane foams, use is practically always made of toluendiisocyanate (TDI) as isocyanate.

Finally in the preparation of the conventional polyether foams mostly no cross-linkers and/or extenders are added.

The invention essentially relates to a flexible polyurethane foam with highly increased fire resistance which, beside the traditional applications, is suitable for applications where a high risk of fire exists such as, for example, cushions of seats for public transport, theaters, movies or mattresses in jails, hospitals, aso.

By the preparation of such polyurethane foams having a high fire resistance, use is actually often of free urea as fire retardant. Due to the strong solubility of that fire retardant in the polyol and the consequent quick and strong increase of viscosity, it is necessary to dose that fire retardant separately during the manufacturing of that polyurethane foam, for example by means of an Archimedes screw. Indeed, due to the strong increase of viscosity which can originate by the addition of that solid fire retardant to the pylyol as liquid dispersion medium, certain problems can arise, i.e. in the field of the dosing (pumping) of the polyol/urea mixture and the continuously variable increasing viscosity of that mixture, which renders an homogeneous dosing impossible and thus also the control of the foaming process and the foam quality. Such a mixture even becomes quasi fixed (physical gel) after less than one day storage in the vessels and the conducts of the installation for manufacturing the foam.

It is also so that, due to the necessity of a separate dosing of the solid fire retardant, it is impossible to make use of the classical technology for preparing the polyurethane foam, which consists in the continuous dosing of liquid components or liquid dispersion in a mixing chamber of said installation.

The main object of the invention is to provide a solution for those different drawbacks and to propose a formulation for preparing the flexible polyurethane foam with a high fire resistance and which can be applied in an easy way on the classical apparatuses for preparing the polyurethane foams.

In order to realize this object, the polyurethane foam according to the invention is characterized in that said fire retardant comprises at least one of the following components: (1) linear urea-formol oligomer mixture having the general formula $NH_2\text{-}CO\text{-}NH\text{-}[CH_2\text{-}NH\text{-}CO\text{-}NH]_n\text{-}CH_2\text{-}NH\text{-}CO\text{-}NH_2$, wherein n can have the value from 0 to 50; (2) urea in powdered form of which the particles are at least partially recovered by a less soluble film, as well of sulfur as of a resin; (3) dicyandiamide having the general formula:

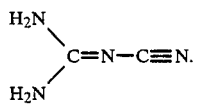

In a particular realization of the invention the content of said fire retardant comprises 20 to 100 pars by weight per 100 parts by weight basic polyol.

In a more particular embodiment of the invention, the polyurethane foam comprises, besides said fire retardant, also between 0 and 50 parts by weight with respect to 100 parts by weight polyol of at least one of the following fire retardants:

a halogenated organic phosphate or phosphonate, such as tris-(2-chloro-ethyl)-phosphate, tris-(dichloropropyl)phosphate, tris-(dibromopropyl) phosphate, tetrakis-(2-chloroethyl)-ethylene-diphosphate;

an organic halogen free phosphate or phosphonate, such as tricresyl-phosphate, dimethyl-methyl-phosphate;

a phosphor free aliphatic halogen compound, such as chlorine paraffin, PVC powder;

an alicyclical or aromatic halogenated compound, such as bromined difenyloxide;

antimony oxide and/or zincborate in a synergic combination with a fire retardant comprising halogen;

an inorganic fire retardant, such as ammonium salt, (more particularly ammonium phosphate, ammonium borate and ammonium sulphate) and aluminiumtrihydrate;

an organic nitrogen compound, different from urea or said urea-formol oligomer, such as melamine, isobutylene diurea.

The invention also relates to a method for manufacturing that polyurethane foam. The method is characterized by the fact that said fire retardant, which is substantially insoluble in the polyol, is dispersed in powdered form in that polyol and that said mixture is thereafter brought into contact with other reaction components for forming the polyurethane foam.

Other particularities and advantages of the invention will become clear from the description given hereunder wherein under more a number of typical examples for possible applicable fire retardants and of the other reaction components of the flexible polyurethane foam according to the invention are given.

This description does not limit the scope of the protection since it is only given by way of example of the invention.

The flexible polyurethane foam, to which the invention relates, is situated in a density range between 20 and 150 kg/m$^3$, more particularly between 25 and 100 kg/m$^3$, and belongs to the type having a heigh elasticity (high resilience foam) on polyether basis.

The concerned polyurethane foam can be manufactured either under the form of blocks by free continuous foaming according to the so-called "one shot slabstock process", or discontinuous in a closed mould ("moulding process").

The most typical density limits for the continuous "one shot slabstock process" are situated preferably between 25 and 80 kg/m$^3$, while for the discontinuous method in a closed mould it is comprised preferably between 40 and 100 kg/m$^3$.

Those foams are characterized by the fact that they comprise a fire retardant which provides to the latter an increased fire resistance, and this also in presence of so-called high ignition sources, such as 150 gr of paper. They find then also their application for cushions or mattresses in so-called "high risk applications" such as public transport, public offices as the one already mentioned.

According to the invention use is made of primary fire retardants which are less soluble in water of polyols. They can be of three kinds: (1) lineary low molecular urea-formol oligomers with the general formula: $NH_2$-CO-NH-[$CH_2$-NH-CO-NH]$_n$-$CH_2$-CO-$NH_2$, wherein n can have the value from 0 to 50 and preferably from 1 to 20; (2) physically modified urea: which consists of powdered urea of which the particles are recovered a less soluble film, such as melted sulphur of certain resins, where the said recovering can represent 5 to 30% by weight with respect to the urea; (3) dicyandiamide with the formula:

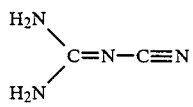

Those three types of fire retardants can be present either alone or in reciprocate combination in the polyurethane foam formula.

Thanks to the strongly limited solubility of the fire retardances in the reaction components for preparing the polyurethane foam, those can be dispersed in the form of grains or powder in the liquid basic polyol, thus allowing an easy dosing and thus enabling the use of the known dosing facilities for manufacturing the flexible polyurethane foam.

The fire extinguishing working of the used fire retardants relies on the thermical decomposition of those nitrogen compounds for forming incombustible gasses, such as water, $CO_2$, ammonium, which dilute the combustible gasses in casu and also have a less supply to additional smoke development and smoke toxicity.

Thus the classical high molecular and/or cleaned urea-formol resins are less convenient as fire retardants in flexible polyurethane foams, due to their too high dissociation temperatures with respect to the dissociation temperature of the polyurethane foam itself.

Those solid fire retardants, according to the invention, can be dosed as fine grains, for example with a diameter of 1 to 3 mm, via the polyol, as dispersion means in the latest, but are preferably further crushed to powders of for example 10 to 300 microns, in order to ease the dosing via dosing pumps. Also in this way a physically more stable and homogeneous dispersion can be obtained and the fire extinguishing characteristics of the polyurethane foam are improved due to the larger contact surface of the powdered fire retardants in the polyurethane foam. The number of those fire retardants, which are of the type of in water or polyol less soluble organic nitrogen compounds, more particularly urea derivates, comprises preferably between 20 and 100 parts by weight per 100 parts by weight basic polyol.

Beside the so-called primary fire retardants the polyurethane foam according to the invention can eventually but not necessarily comprise other known fire retardants which thus enable to improve the fire extinguishing working.

The concentration of those additional fire retardants, called secunary fire retardants, varies generally between 0 and 50 parts by weight and most typically between 3 and 25 parts by weight with respect to 100 parts by weight polyol.

Examples of such secondary fire retardants are: halogenated organic phosphates or phophonates, such as: tris-(dichloro-propyl)phosphate, tris-(2-chloroethyl)-phosphate, tris-(monochlorpropyl) phosphate, tri-(dibromopropyl) phosphate, tetrakis-(2-chloroethyl)-ethylene-diphosphate, a.s.o.

phosphorus free aliphatic halogen compounds, such as chloroparaffin, PVC powder;

alicyclical or aromatic halogenated compounds, such as polybromide diphenyloxide, a.s.o.

antimony oxide and/or zincborate in synergic combination with an halogen comprising a fire retardant;

inorganic fire retardants, such as ammonium salt, (more particularly ammoniumphosphate, ammoniumborate and ammoniumsulphate), aluminium trihydrate;

organic nytrogen compounds, different from urea or said urea-formal oligomers, such as melamine, isobutylen diure.

A melamine in an amount of 10 to 15 parts by weight per 100 parts by weight polyol is preferably chosen as secunary fire retardant.

In a more specific embodiment of the invention, use is made of a linear urea-formol oligomer with said general formula wherein n can vary from 1 to 20 in combination with melamine in respective weight proportion: linear formol oligomer/melamine of 2/1 to ½ and/or in combination with said halogenated organic phosphate in a respective weight proportion: linear formol oligomer/halogenated phosphate from 1/0.02 to 1/1.

The halogenated organic phosphate or phosphonate can eventually also, beside phosphor and halogen, comprise reactive OH groups which can be built in the polymer chain after reaction with the isocyanate. Such fire retardants are inter alia sold by Hoechst under de name "Exolit 107" and "Exolit 413".

Further the flexible polyurethane foam according to the invention which comprises at least one of said above described primary fire retardants, is prepared on the base of the following raw materialsd 1. Polyols Those consist essentially of high molecular, reactive polyooxyalkylene compounds which are prepared via polyaddition of propylenoxide (PO) and ethyleneoxide (EO) on polyfunctional initiator molecules with OH and/or NH, and/or $NH_2$ groups, of which the most typical are glycerol and trimethylolpropane.

Further, the content of primary OH groups with respect to the sum of the primary and the secundary OH groups comprises at least 60%, the molecular weight is preferably comprised between 4500 and 6500 for functionality of 3, the number of functional end groups per polyol molecule varies from 2 to 4, but is preferably equal to 3, and has a hydroxyl number which can vary from 20 to 40 and preferably from 24 to 38.

Those high molecular active polyols can either or not comprise organic polymer filling materials which are present under the form of dispersions.

The organic filling materials - if present - can be of the following type:

vinyl(co)polymers (polystyrene, polyacrylonitril ...), whereby the vinylmonomers in casu or polymerised (via a radicalar process) in the basic polyol and thus are also partially grafted thereupon. Such polyols are called "grafted polymer polyols";

polyurea addition products, originated by the reaction in casu, between an isocyanate (for example toluenediisocyanate) and a polyamide (for example hydrazine) in the basic polyol as liquid reaction medium. Such polyols are sold by Bayer/Mohay under de name "PHD polyols", also known under the name "Polyharnstoff Dispersion Polyole";

polyurea or polyurethane addition products, originated by the reaction in question between an isocyante, (for example, toluenediisocyanate) en an alkanolamine (for example diethanolamine or triethanolamine) in the basic polyol as liquid reaction medium (such polyols are sold on the market under the name "PIPA polyols").

The foam formulation for high resiliant foams can be based on the above described polyols without filling materials or alternatively on the basis of polyols with organic filling materials, whereby in that case the filling amount can comprise 4 to 20% by weight (and more typically 6 to 15% by weight). Such filled polyols can of course be a mixture of a not filled polyol and of less or more concentrated polyol.

2. Isocyanates

The most typical isocyanates are toluenediisocyanate (TDI), 4,4'-diphenylmethanediisocyanate (MDI) and chemically modified derivates thereof (such as prepolymere, isocyanurate, biurate, carbodiimide, a.s.o. ... ).

Also mixtures of TDI and MDI, either under pure form or in form of derivates, are possible.

The NCO index of those isocyanates varies preferably between 90 and 120.

3. Catalytic agents

As catalytic agents in the present invention, use is preferably made of tertiary amines, such as triethylenediamine, dimethylaminoethanol, bis-(2-methyl)aminoethylether, a.s.o. ... which are typically used in a flexible polyether and high resilient foams.

Beside those tertiary amines, use can also be made of organometal catalytic agents, as is also used in flexible polyether and high resilient foams.

Typical examples thereof are tinoctonate and dibutylindilaurate.

4. Cross-linkers/extenders

Those are generally formed by low molecular hydrogen active compounds with a functionality of 2 to 8 having OH and/or NH and/or $NH_2$ groups, that is to say polyalcohols, polyamines and alkanolamines.

Those compounds can perform several functions such as:

controlling the balance between the polymerization (gellification) and the blowing (foaming) during the foaming process;

increasing (=catalyse) the reaction speed during the foaming process (in the case of presence of tertiary nitrogen in the compound);

influencing the physical characteristics (compression resistance, a.s.o. ... ) of the obtained foamed materials.

Typical examples of such compounds are diethanolamine, triethanolamine, ethylenglycol, propylenoxide en ethylenoxide addition materials on ethylendiamine, trimethylolpropane, glycerol, diisopropylamine, aromatic diamines, a.s.o. ...

5. Blast means

As a chemical blast mean, use is still made of water, and that preferably in an amount of 0.8 to 5 parts by weight per 100 parts by weight polyol, more specifically 2 to 4 parts by weight per 100 parts by weight polyol. By reaction of water with the isocyanate $CO_2$ gas is formed.

Eventually beside water, use can be made of a physical blast means, such as low cooking liquid halogen hydrocarbon materials. For example trichlorofluoromethane and methylenechloride.

The amount of such a physical blast means varies generally between 0 and 30 parts by weight per 100 parts by weight basic polyol and most specifically between 0 and 20 parts by weight thereof.

6. Tensioactives

Eventually, in order to obtain an additional stabilization and homogenity of the cellular structure of the polyurethane foam, such tensioactive compounds, are often added with a relatively low molecular weight with respect to the one used for the conventional polyether foams. Further those compounds have a weaker foam stabilizing capacity as the one of polyether foams.

The most typically thereof are inter alia polydimethyl-siloxene oils or polydimethylsiloxane-polyether copolymers, as often used in high resilient formulations (HR). Such compounds are for example "L5307", "L:5305" and "L5309" (Union Carbide); "B4113" and "B4380" (Goldschmidt); Q2-5043 (Dow Corning); "KS43" and "KS53" (Bayer); a.s.o. ...

In the tables given hereunder a number of examples of formulations of polyurethane foams with their characteristics according to the invention are given.

Abbreviations and codes which are used in those tables are explained hereunder, as well as for what concerns the raw materials and the characteristcs.

1. RAW MATERIALS (a) Polyols
P1 = reactive polyethertriol type
addition product: glycerol+propyleneoxide (PO)- +ethyleneoxide (EO)
functionality: 3
% prim OH: 75 % EO (with respect to EO+PO): 13
hydroxyl number (IOH): 36
MG: 4700

P2=idem P1 but % prim. OH: 85
% EO: 15
IOH: 28
MG: 6000

P3=idem P1, but with polyurea filling material dispersed (PHD) having an amount PHD dispersed in a total polyol: 7% by weight P4 analogous to P1, but with dispersed polyacrylonitrile-polystyren copolymer dispersed in total polyol: 10% by weight P5 analogous to P1, but with "PIPA" dispersed in total polyol: 10% by weight (type PIPA=addition product TDI+triethanolamine).

(b) Isocyanates

I1=TDI 80/20 (mixture 80% 2-4 toluenediisocyanate+20% 2-6 toluenediisocyanate)

I2 - chemical modified TDI, type "Desmodur MT58" (Bayer) - % NCO=40.5

I3=raw MDI (oligomer mixture on the base of 4,4'-diphenylmethan-diisocyanate - % NCO=31, for example Desmodur 44V20 (Bayer)

I4=prepolymer on the basis of pure MDI, type "Supracec VM28" (ICI)-NCO %=25

(c) Blast means

TW=total water in formula (parts by weights per 100 parts polyol) (i.e. taking into account the eventual presence of water in the used raw materials)

F11=trichlorofluoromethane

MC=methylen chloride.

(d) Catalytic agents

CO33LV=DABCO 33LV=33% solution triethylenediamine in dipropylene-glycol solution cat. A1 (UC)=70% solution bis-(2-methyl)-aminoethylether in dipropyleneglycol solution mean.

cat. A107 (UC)=tertiary amine catalytic agent (Union Carbide) with delayed action (=slow start but quick curing), typically used in "moulding" HR systems, prepared according to the foam mould method DBTDL=dibutylindilaurate (e) Tensioactives L5307 (UC)=polydimethylsiloxan-polyether copolymer of Union Carbide, typically used as cell stabilisator in high resilient block foam.

B4113 (Goldschmidt)=polymdimethylsiloxan-polyether copolymer of Goldschmidt, typically used as cell regulator in high resilient foam (block or mould) - less stabilizing operation than the type L5307.

(f) Cross-linkers

DEOA=diethanolamine

TEOA=triethanolamine

DIPA=diisopropanolamine glycerol (g) Fire retardants

F1=urea-formol oligomer mixture, according to the above mentioned formula wherein n equals 4, which is crushed to powder with a mean granulometry of 50 microns F1bis: analogous F1, but wherein n in average equals 10

F1tris: analogous to F1, but wherein n average equals 30

F1quater: analogous to F1, but wherein n average equals 50

F2=sulphur coated urea (20% weight sulphur) - fine grains with a diameter of ±1 mm.

F3=dicyanediamide (mean grain dimension: 80 microns)

F4=tris-(2-chloroethyl)-phosphate

F5=melamine

2. PHYSICAL CHARACTERISTICS OF THE FOAMS

RG=netto density in kg/m$^3$ (free foam)

DM=global moulded density in kg/m$^3$;

CLD 40%: compression hardness by 40% compression expressed in kilopascal=kPa (norm. ISO 3386)

ILD 25%: indentation hardness - expressed in Newton (norm ISO 2439B)

ER=elongation at break in % (norm ISO 1798)

RR=tensile strength in kPa (norm ISO 1798)

TR=tear resistance in Newton/cm (norm ASTM D 3574)

CS 50%=compression set by 50% compression (22 hours - 70° C.) according to ISO 1856A EL=resilience ball rebound in % - ASTM D3574

LOI=oxygen index according to ASTM 2863-74. More the number is high, more the fire resistance is better (easily combustible foams have LOI=21). An LOI 28 indicates a very high inherent fire resistance.

MVSS302=automobile fire test.

SE=self extinguishing

F=failing (firespeed 100 mm/min)

Calif. 117 A=furniture fire test (California State)

P=satisy (for and after a heat behaviour of 104° C./22 hours)

F=fails

UL 94 HF1=UL 94 horizontal fire test (Underwriters Laboratories USA); in that test, which is typically imposed for electronical applications, there may not be a formation of burning drops during the test.

P=pass

F=fails

F/P=limit case

NBS: smoke chamber test (ASTM E662)=airbus ATS1000.001 norm. Here the maximum optical smoke density (DS max.) is measured under flaming (FL) or smouldering (SM) test conditions. Also the concentrration of eventually toxical smoke gasses (ppm), such as HCl, . . . , is sometimes measured. norm. airbus: DS max. (after 4 to 6 minutes): <200 p.p.m. (FL & SM conditions):

ppm HCl after 1.5 min.: <50 after 4 min.: <500

Blowtorch test: internal fire test, whereby a oxygen rich flame (blue) (1100° C.-15 cm length) is applied perpendicular on a 3 cm large test steel plate during 30 sec. at a distance of 3 cm (between the output of the blowtorch and the test steel).

Boston test (USA): practical, full scale fire test, whereby in de corner (slit) between the sit and the back cushions 140 g paper as ignition source is ignited. Satisfies (P) in case that the loss of weight of the foam after the test is less than 15%. BS 5852 - part 2 test with "crib 5" as ignition source; this test is presented in Great Britain for furniture and imposes that, after the test has been executed on a complex polyurethane foam filling in combination with a standard FR-esther cover, the following criteria are simultaneously satisfied:

loss of weight after the test: <60 g maximum burning time: <10 min.

maximal after-smouldering time: <60 min.

In the different tables where the formulation is given in parts by weights with respect to 100 parts basic polyol while the isocyanates are expressed in NCO index (stoechiometric relation in NCO with respect to the hydrogen active compounds).

Table I relates to examples of polyurethane formulation of the block foam type, wherein the raw materials are mixed among each other by hand on a scale of 300 g polyol with the remaining component in relation ("handmix technic").

In Table II examples of polyurethane foam formulations are given, also of the block foam type whereby use is made of a "pilot plant" machine, wherein fire retardants are pre-mixed by dispersion in the basic polyol.

Table III relates to some typical examples of flexible polyurethane foam formulations according the mould foaming method.

In table IV the characteristics of the polyurethane foam according to table I are illustrated.

Table V relates to the characteristics of the polyurethane foam according to table II, while table VI relates to the characteristics of the polyurethane foam according to table III, whereby all characteristics are measured on mould cushions (included with skin).

The polyurethane foams according to the examples of table III are manufactured by means of a low pressure injection machine with the three following separate components:

polyol together with fire retardant, the necessary amount of water, the tensioactives and eventually other additional materials;
the isocyanate;
the physical blast means (F11 or MC)

The injection is realized in a metal test mould with dimensions of 40×40×10 cm and at a mould temperature of 50° C.

After the injection the mould is closed so that no free foaming can take place, in contrast with what is the case for block foaming, and this mould is kept closed during 10 to 15 minutes.

Thereafter the thus becomed cushion is demoulded and submitted to mechanical crushing via compression between rollers.

The processing, that is to say the technological operation capability during the foam process and the visual aspect of the thus obtained foam materials, are fully satisfying in all those examples (tables I, II and III).

On a somewhat unexpected way, it has been established that the use of fire retardants of the so-called linear urea-formol oligomer mixture also significantly improves the thermoforming characteristics of the polyurethane foam.

By thermoforming characteristics there is meant that the easy and remaining deformation of the foam under influence of temperature and compression (for example between two heated plates in a mould).

TABLE 1

Formulations of block foam types ("handmix").

| NR. | 1 | 2 | 3 | 4 | 5 | 6 | 7 | 8 | 9 | 10 | 11 |
|---|---|---|---|---|---|---|---|---|---|---|---|
| P2 | 100 | — | — | — | 100 | — | — | — | — | — | — |
| P3 | — | 100 | — | — | — | — | — | — | — | — | — |
| P4 | — | — | 100 | — | — | 100 | 100 | 100 | 100 | 100 | 100 |
| P5 | — | — | — | 100 | — | — | — | — | — | — | — |
| I1 (index) | — | 110 | 110 | 110 | — | (*) | 110 | 110 | 110 | 110 | 110 |
| I2 (index) | 100 | — | — | — | — | — | — | — | — | — | — |
| I3 (index) | — | — | — | — | — | (*) | — | — | — | — | — |
| I4 (index) | — | — | — | — | 100 | — | — | — | — | — | — |
| TW | 3,5 | 3 | 3 | 3 | 3,5 | 3 | 3 | 3 | 3 | 3 | 3 |
| F11 | 3 | 4 | 4 | 4 | 10 | 5 | — | — | — | — | 4 |
| C0333LV | 0,45 | 0,15 | 0,15 | 0,15 | 0,30 | 0,15 | 0,15 | 0,15 | 0,15 | 0,15 | 0,15 |
| Cat Al | — | 0,05 | 0,05 | 0,05 | 0,05 | 0,05 | 0,05 | 0,05 | 0,05 | 0,05 | 0,05 |
| DBTDL | — | 0,2 | 0,3 | 0,2 | 0,2 | 0,2 | 0,3 | 0,3 | 0,3 | 0,3 | 0,3 |
| DEOA | 0,3 | 1,5 | 1,5 | 1,5 | 1 | 1,3 | 1 | 1 | 1 | 1,2 | 1,5 |
| TEOA | 2 | — | — | — | — | — | — | — | — | — | — |
| DIPA | 4 | — | — | — | — | — | — | — | — | — | — |
| L5307 | — | 1,3 | 1,3 | 1,3 | — | 1,3 | 0,5 | 0,5 | 0,5 | 0,9 | 1,3 |
| B4113 | 0,5 | — | — | — | — | — | — | — | — | — | — |
| F1 | 50 | 50 | 50 | 50 | 50 | 50 | — | — | 10 | 30 | 50 |
| F2 | — | — | — | — | — | — | — | — | — | — | — |
| F3 | — | — | — | — | — | — | — | — | — | — | — |
| F4 | 10 | 10 | 10 | 10 | 10 | 10 | — | 10 | — | — | — |

| NR. | 12 | 13 | 14 | 15 | 16 | 17 | 18 | 19 | 20 | 21 |
|---|---|---|---|---|---|---|---|---|---|---|
| P2 | — | — | — | — | — | — | — | — | — | — |
| P3 | — | — | — | — | — | — | — | — | — | — |
| P4 | 100 | 100 | 100 | 100 | 100 | 100 | 100 | 100 | 100 | 100 |
| P5 | — | — | — | — | — | — | — | — | — | — |
| I1 (index) | 110 | 110 | 110 | 110 | 110 | 110 | 110 | 110 | 110 | 110 |
| I2 (index) | — | — | — | — | — | — | — | — | — | — |
| I3 (index) | — | — | — | — | — | — | — | — | — | — |
| I4 (index) | — | — | — | — | — | — | — | — | — | — |
| TW | 3 | 3 | 3 | 3 | 3 | 3 | 3 | 3 | 3 | 3 |
| F11 | 4 | 4 | 4 | 4 | 4 | 4 | 4 | 4 | 4 | 4 |
| C033LV | 0,15 | 0,15 | 0,15 | 0,15 | 0,15 | 0,15 | 0,15 | 0,15 | 0,15 | 0,15 |
| Cat Al | 0,05 | 0,05 | 0,05 | 0,05 | 0,05 | 0,05 | 0,05 | 0,05 | 0,05 | 0,05 |
| DBTDL | 0,3 | 0,3 | 0,3 | 0,3 | 0,3 | 0,3 | 0,3 | 0,3 | 0,3 | 0,3 |
| DEOA | 1,8 | 1,2 | 1,3 | 1,8 | 1,3 | 1,7 | 2 | 1,4 | 1,7 | 1,5 |
| TEOA | — | — | — | — | — | — | — | — | — | — |
| DIPA | — | — | — | — | — | — | — | — | — | — |
| L5307 | 1,3 | 0,9 | 1,3 | 1,3 | 1,3 | 1,3 | 1,3 | 1,3 | 1,3 | 1,3 |
| B4113 | — | — | — | — | — | — | — | — | — | — |
| F1 | 100 | 30 | 30 | 100 | — | — | — | — | — | 25 |
| F2 | — | — | — | — | 30 | 50 | 50 | — | — | — |

TABLE 1-continued

Formulations of block foam types ("handmix").

| | | | | | | | | | | |
|---|---|---|---|---|---|---|---|---|---|---|
| F3 | — | — | — | — | — | — | — | 50 | 100 | 25 |
| F4 | — | 10 | 20 | 10 | — | — | 10 | — | 10 | 10 |

(*)Mixture 80% by weight 11 + 20% by weight 13 (index 105)

TABLE II

Formulations block foam types (machine)

| NR. | 22 | 23 | 24 | 25 | 26 | 27 | 28 | 29 | 30 | 31 | 32 | 32/2 | 32/3 | 32/4 | 32/5 | 32/6 | 32/7 | 32/8 |
|---|---|---|---|---|---|---|---|---|---|---|---|---|---|---|---|---|---|---|
| P3 | 100 | — | — | 100 | — | — | — | — | — | — | — | 100 | 100 | 100 | 100 | 100 | 100 | 100 |
| P4 | — | 100 | — | — | 100 | 100 | 100 | 100 | 100 | 100 | 100 | — | — | — | — | — | — | — |
| P5 | — | — | 100 | — | — | — | — | — | — | — | — | — | — | — | — | — | — | — |
| I1 (index) | 110 | 110 | 110 | (*) | 105 | 115 | 110 | 110 | 110 | 110 | 110 | 110 | 110 | 110 | 110 | 110 | 110 | 110 |
| I3 (index) | — | — | — | (*) | — | — | — | — | — | — | — | — | — | — | — | — | — | — |
| TW | 3 | 3 | 3 | 3 | 2,5 | 3,5 | 3 | 3 | 3 | 2,5 | 3 | 3 | 3 | 3 | 3 | 3 | 3 | 3 |
| F11 | 4 | 4 | 4 | 5 | 10 | — | 4 | 4 | 4 | — | 4 | 4 | 4 | 4 | 4 | 4 | 4 | 4 |
| C033LV | 0,15 | 0,15 | 0,15 | 0,25 | 0,25 | 0,15 | 0,15 | 0,15 | 0,15 | 0,15 | 0,20 | 0,15 | 0,15 | 0,15 | 0,15 | 0,15 | 0,15 | 0,15 |
| Cat A1 | 0,05 | 0,05 | 0,05 | 0,05 | 0,07 | 0,03 | 0,05 | 0,05 | 0,05 | 0,05 | 0,05 | 0,05 | 0,05 | 0,05 | 0,05 | 0,05 | 0,05 | 0,05 |
| DBTDL | 0,2 | 0,2 | 0,2 | 0,2 | 0,3 | 0,3 | 0,2 | 0,2 | 0,2 | 0,2 | 0,3 | 0,2 | 0,2 | 0,2 | 0,2 | 0,2 | 0,1 | 0,1 |
| DEOA | 1,5 | 1,5 | 1,5 | 1,3 | 2,0 | 1,7 | 1,9 | 2,0 | 1,8 | 1 | 1,7 | 1,5 | 1,6 | 1,7 | 1,5 | 1,5 | 1,1 | 1,0 |
| L5307 | 1,3 | 1,3 | 1,3 | 1,3 | 1,5 | 1,3 | 1,3 | 1,0 | 1,3 | 0,5 | 0,5 | 1,3 | 1,3 | 1,3 | 1,3 | 1,3 | 0,8 | 0,8 |
| F1 | 50 | 50 | 50 | 50 | 50 | 50 | — | — | 25 | — | — | — | — | — | 25 | — | 20 | — |
| F3 | — | — | — | — | — | — | 50 | 100 | 25 | — | — | — | — | — | — | — | — | — |
| F4 | 10 | 10 | 10 | 10 | 10 | 10 | 10 | 10 | 20 | 10 | 50 | 10 | 10 | 10 | 10 | 10 | 3 | 3 |
| F5 | — | — | — | — | — | — | — | — | — | — | — | — | — | — | 25 | 50 | — | 20 |
| F1 bis | — | — | — | — | — | — | — | — | — | — | — | 50 | — | — | — | — | — | — |
| F1 tris | — | — | — | — | — | — | — | — | — | — | — | — | 50 | — | — | — | — | — |
| F1 quater | — | — | — | — | — | — | — | — | — | — | — | — | — | 50 | — | — | — | — |

(*)Mixture 80% by weights + 20% by weights 13 (index 105)

TABLE III

Formulations mould foam types (machine)

| NR | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| P1 | 100 | — | — | — | — | — | — | — | — | — | — | — | — | 100 | 100 | 100 |
| P3 | — | 100 | — | — | — | — | — | — | — | — | — | — | — | — | — | — |
| P4 | — | — | 100 | — | 100 | 100 | 100 | 100 | 100 | 100 | 100 | 100 | 100 | — | — | — |
| P5 | — | — | — | 100 | — | — | — | — | — | — | — | — | — | — | — | — |
| I1 (index) | — | 105 | 105 | 105 | 105 | 100 | — | (*) | — | — | — | — | (*) | — | — | — |
| I2 (index) | 105 | — | — | — | — | — | — | — | 105 | 105 | 105 | 105 | — | 105 | 105 | 105 |
| I3 (index) | — | — | — | — | — | — | — | (*) | — | — | — | — | (*) | — | — | — |
| I4 (index) | — | — | — | — | — | — | 100 | — | — | — | — | — | — | — | — | — |
| TW | 3 | 3 | 3 | 3 | 3 | 3 | 3 | 3 | 3 | 3 | 3 | 3 | 3 | 3 | 3 | 3 |
| F11 | 10 | 10 | 10 | 10 | 20 | — | 20 | 10 | 10 | 10 | — | 10 | — | 10 | 10 | 10 |
| MC | — | — | — | — | — | 20 | — | — | — | — | 20 | — | — | — | — | — |
| CO33LV | 0,25 | 0,25 | 0,25 | 0,25 | 0,25 | 0,25 | 0,25 | 0,25 | 0,25 | 0,25 | 0,25 | 0,25 | 0,25 | 0,25 | 0,25 | 0,25 |
| A107 | 0,4 | 0,4 | 0,4 | 0,4 | 0,4 | 0,4 | 0,4 | 0,4 | 0,4 | 0,4 | 0,4 | 0,4 | 0,3 | 0,4 | 0,4 | 0,4 |
| DBTDL | 0,2 | 0,2 | 0,2 | 0,2 | 0,2 | 0,2 | 0,2 | 0,2 | 0,2 | 0,2 | 0,2 | 0,2 | 0,05 | 0,2 | 0,2 | 0,15 |
| DEOA | 1,5 | 1,5 | 1,5 | 1,5 | 1,5 | 1,5 | 1,5 | 1,5 | 1,5 | 1,5 | 1,5 | 1,5 | 1 | 1,5 | 1,5 | 1,2 |
| B4113 | 1 | — | — | — | — | — | — | — | — | — | — | — | — | 1 | 1 | 1 |
| L5307 | — | 1 | 1 | 1 | 1 | 1 | 1 | 1 | 1 | 1 | 1 | 1 | 1 | — | — | — |
| F1 | 50 | 50 | 50 | 50 | 50 | 50 | 50 | 50 | 50 | — | — | 25 | — | 25 | 25 | — |
| F2 | — | — | — | — | — | — | — | — | — | 50 | — | — | — | — | — | — |
| F3 | — | — | — | — | — | — | — | — | — | — | 75 | 25 | — | — | — | — |
| F4 | 10 | 10 | 10 | 10 | 10 | 10 | 10 | 10 | 10 | 10 | 10 | 20 | 10 | 10 | 10 | 3 |
| F5 | — | — | — | — | — | — | — | — | — | — | — | — | — | — | 25 | — |
| F1 tris | — | — | — | — | — | — | — | — | — | — | — | — | 50 | — | — | — |

(*)Mixture 80% by weight II + 20% by weight 13 (NC0 index 105)

TABLE IV

Characteristics of the block foam types of table I.

| NR. | 1 | 2 | 3 | 4 | 5 | 6 | 7 | 8 | 9 | 10 | 11 |
|---|---|---|---|---|---|---|---|---|---|---|---|
| RG | 41 | 39 | 40 | 40 | 42 | 40 | 27 | 28 | 28 | 31 | 38 |
| CLD 40% | 30 | 2,8 | 2,8 | 2,7 | 3,1 | 2,8 | 2,1 | 2,0 | 2,0 | 2,5 | 2,9 |
| CS 50% | 7 | 7 | 6 | 7 | 6 | 6 | 4 | 3 | 5 | 6 | 7 |
| EL | 60 | 57 | 56 | 56 | 53 | 55 | 60 | 61 | 60 | 58 | 55 |
| MVSS302 | SE | SE | SE | SE | SE | SE | F | SE | SE | SE | SE |
| Blow torch test (Class) | (1) | (1) | (1) | (1) | (1) | (1) | (4) | (3) | (3) | (3) | (1)-(2) |
| Calif 117A | P | P | P | P | P | P | F | P | P | P | P |
| LOI | 32 | 31 | 31 | 31 | 32 | 31 | 21 | 24 | 23 | 26 | 29 |

| NR. | 12 | 13 | 14 | 15 | 16 | 17 | 18 | 19 | 20 | 21 |
|---|---|---|---|---|---|---|---|---|---|---|
| RG | 48 | 32 | 33 | 50 | 32 | 40 | 41 | 39 | 47 | 39 |
| CLD 40% | 3,7 | 2,4 | 2,3 | 3,6 | 2,6 | 2,9 | 2,8 | 2,7 | 3,9 | 3,0 |
| CS 50% | 9 | 5 | 5 | 8 | 6 | 7 | 7 | 7 | 9 | 7 |
| EL | 52 | 59 | 59 | 53 | 57 | 54 | 55 | 54 | 50 | 55 |
| MVSS302 | SE | SE | SE | SE | SE | SE | SE | SE | SE | SE |
| Blow torch test (Class) (*) | (1) | (2) | (1)-(2) | (1) | (3) | (1)-(2) | (1) | (2) | (1) | (1) |
| Calif 117A | P | P | P | P | P | P | P | P | P | P |
| LOI | 32 | 28 | 29 | 34 | 25 | 28 | 30 | 28 | 31 | 31 |

| Classif. blow torch test | (1) | (2) | (3) | (4) |
|---|---|---|---|---|
| time of back burning (sec) | zero | 3–10 | 10 | burns completely |
| complete burning time (sec) | 10 | 7 | 4 | 2 |
| char (carbonisation) | light | very light | no medium/ | no |
| dripping | light | medium | strong | strong |

TABLE IV-continued
Characteristics of the block foam types of table I.

| | | |
|---|---|---|
| strong | | |
| | medium/ | |
| smoke development | light light | medium strong |

(*)All steels are melting away by flaming, but do not provide burning drops (except ex. 7)

TABLE V
Characteristics of the block foam types of table II

| NR. | 22 | 23 | 24 | 25 | 26 | 27 | 28 | 29 | 30 | 31 | 32 |
|---|---|---|---|---|---|---|---|---|---|---|---|
| RG | 38 | 39 | 38 | 40 | 39 | 38 | 37 | 48 | 38 | 39 | 47 (**) |
| CLD 40% | 2,4 | 2,5 | 2,4 | 2,6 | 1,5 | 3,1 | 2,4 | 4,0 | 2,9 | 2,5 | 1,7 (**) |
| CS 50% | 5 | 6 | 5 | 4 | 7 | 6 | 6 | 7 | 6 | 4 | 25 |
| EL | 56 | 56 | 57 | 56 | 54 | 54 | 55 | 55 | 56 | 62 | 52 |
| ER | 115 | 120 | 105 | 100 | 115 | 100 | 110 | 80 | 110 | 140 | 150 |
| RR | 80 | 80 | 70 | 70 | 70 | 80 | 80 | 65 | 70 | 120 | 90 |
| TR | 2,5 | 2,8 | 2,1 | 2,1 | 2,1 | 2,2 | 2,2 | 1,7 | 2,1 | 2,9 | 2,0 |
| MVSS302 | SE | SE | SE | SE | SE | SE | SE | SE | SE | SE | SE |
| Blow torch test (*) (class) | (1) | (1) | (1) | (1) | (1) | (1) | (1)-(2) | (1) | (1) | (3)-(4) | (2)-(3) |
| Calif 117 A | P | P | P | P | P | P | P | P | P | P | P |
| LOI | 31 | 30 | 32 | 31 | 31 | 29 | 29 | 30 | 31 | 24 | 27 |
| UL94 HFI | P | P | P | P | P | P | P | P | P | F/P | P |
| NBS | | | | | | | | | | | |
| DS MAX (FL) | 110 | 120 | 100 | 115 | 100 | 125 | 65 | 135 | 100 | 110 | (250)(****) |
| ppm HCl (FL) after 1,5/4 minutes | 5/10 | 10/15 | 10/15 | 5/10 | 10/15 | 10/15 | 5/10 | 5/5 | 20/30 | 10/20 | 150/200 (****) |
| Boston test | P | P | P | P | P | P | P | P | P | FF(***) | F |
| B55852 - Crib 5 | P | P | P | P | P | P | P | P | P | F | P |
| processing | OK | OK | OK | OK | OK | OK | OK | OK | OK | OK | (**) |

| NR | 32/2 | 32/3 | 32/4 | 32/5 | 32/6 | 32/7 | 32/8 |
|---|---|---|---|---|---|---|---|
| RG | 39 | 39 | 38 | 37 | 38 | 28 | 29 |
| CLD 40% | 2,5 | 2,7 | 2,9 | 2,7 | 2,9 | 1,8 | 2,0 |
| CS 50% | 4 | 3 | 3 | 4 | 4 | 4 | 3 |
| EL | 56 | 55 | 53 | 57 | 57 | 57 | 57 |
| ER | 120 | 115 | 115 | 120 | 120 | 100 | 105 |
| RR | 85 | 75 | 80 | 85 | 80 | 70 | 65 |
| TR | 2,4 | 2,6 | 2,6 | 2,6 | 2,7 | 2,2 | 2,3 |
| MVSS302 | SE | SE | SE | SE | SE | SE | SE |
| Blow torch test (*) (class) | (1) | (1) | (1) | (1) | (1) | (3) | (3) |
| Calif 117 A | P | P | P | P | P | P | P |
| LOI | 30 | 31 | 29 | 30 | 29 | 27 | 26 |
| UL94 HFI | P | P | P | P | P | P | P |
| DS MAX (FL) | 100 | 105 | 105 | 150 | 250 | 60 | 110 |
| ppm HCl (FL) after 1,5/4 minutes | 5/10 | 5/10 | 5/10 | 5/10 | 5/10 | 0/5 | 0/5 |
| Boston test | P | P | P | P | P | F | F |
| B55852 - Crib 5 | P | P | P | P | P | P | P |
| processing | OK | OK | OK | OK | OK | OK | OK |

(*) Classification blow torch test: see table IV.
(**) example 32: critical processing: partial collaps of the foam and still tendency to shrink, very soft foam (weakening working of the fire retardant F4) notwithstanding high density ((RG:47)
(***) Burns completely (+ very strong smoke development)
(****) Thus does not satisfy the ATS-1000 requirement with respect to smoke development and ppm HCl in smoke gasses.
Conclusion: Bader results of the combustion characteristics by use of only traditional secondary fire retardants F4 (example 31 and 32) without primary fire retardants (F1, F2, or F3).

TABLE VI
Characteristics mould foam types of table III

| NR. | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| DM | 66 | 65 | 61 | 62 | 54 | 50 | 63 | 66 | 64 | 65 | 62 | 63 | 51 | 64 | 63 | 44 |
| ILD 25% | 135 | 145 | 150 | 120 | 100 | 145 | 150 | 180 | 160 | 180 | 165 | 120 | 140 | 150 | 90 |
| Sag. factor* | 4,2 | 3,7 | 3,8 | 3,8 | 3,7 | 3,8 | 3,7 | 3,7 | 4,0 | 4,1 | 4,5 | 4,0 | 2,8 | 4,0 | 4,1 | 3,2 |
| CS 50% | 6 | 7 | 7 | 7 | 8 | 7 | 6 | 7 | 6 | 7 | 9 | 6 | 4 | 4 | 4 | 4 |
| EL | 56 | 53 | 53 | 54 | 54 | 55 | 50 | 53 | 55 | 54 | 51 | 54 | 58 | 57 | 57 | 58 |
| LOI | 33 | 31 | 30 | 31 | 32 | 31 | 32 | 31 | 32 | 32 | 31 | 33 | 24 | 32 | 31 | 26 |
| MVSS302 | SE | SE | SE | SE | SE | SE | SE | SE | SE | SE | SE | SE | SE | SE | SE | SE |
| Blow torch test (class) | (1) | (1) | (1) | (1) | (1) | (1) | (1) | (1) | (1) | (1) | (1) | (1) | (4) | (1) | (1) | (3) |
| Calif 117A | P | P | P | P | P | P | P | P | P | P | P | P | P | P | P | P |
| UL 94 HFL | P | P | P | P | P | P | P | P | P | P | P | P | F/P | P | P | P |
| Boston test | P | P | P | P | P | P | P | P | P | P | P | P | FF** | P | P · | F |
| B 55852-Crib 5 | P | P | P | P | P | P | P | P | P | P | P | P | F | P | P | P |

TABLE VI-continued

| | Characteristics mould foam types of table III | | | | | | | | | | | | | | | |
|---|---|---|---|---|---|---|---|---|---|---|---|---|---|---|---|
| NR. | 33 | 34 | 35 | 36 | 37 | 38 | 39 | 40 | 41 | 42 | 43 | 44 | 45 | 46 | 47 | 48 |

*Ratio $\frac{\text{ILD 65\% ind.}}{\text{ILD 25\% ind.}}$

**Burns completely (+ strong smoke development)

Conclusion: again much improved fire characteristics (according to LOI, Boston test, blow torch test & UL94) for the examples 33-34 with respect to blanco example 45 (without primary fire retardant type F1, F2 or F3).

What is claimed is:

1. A flexible highly elastical polyurethane foam having a density ranging between 25 and 150 kg/m³ and a relatively high fire resistance obtained by a reaction of an isocyanate and/or a chemically modified derivate thereof with a high molecular weight reactive polyol in the presence of a catalytic agent, a cross-linker, and/or an extender, of water as a blowing agent and a fire retardant, characterized in that said fire retardant comprises at least one of the following components:
   (1) linear urea-formol oligomer mixture having the general formula $NH_2$-CO-NH-($CH_2$-NH-CO-NH)$_n$-$CH_2$-NH-CO-$NH_2$, wherein n can have the value from 0 to 50;
   (2) urea in powdered form of which the particles are at least partially covered by a film of less soluble material;
   (3) dicyandiamide having the general formula:

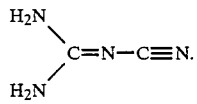

2. A polyurethane foam as claimed in claim 1, characterized in that said fire retardant essentially comprises said linear ureaformol oligomer mixture having the general formula $NH_2$-CO-NH-[$CH_2$-NH-CO-NH]$_n$-$CH_2$-NH-CO-$NH_2$, wherein n can have the value from 0 to 50.

3. A polyurethane foam as claimed in claim 2, characterized in that in the general formula of said urea-formol oligomer mixture n has the value from 0 to 20.

4. A polyurethane foam as claimed in claim 1, characterized in that said fire retardant essentially comprises said urea in powdered form at least partially covered by a film of a less soluble material.

5. A polyurethane foam as claimed in claim 1, characterized in that said fire retardant essentially comprises said dicyandiamide having the general formula:

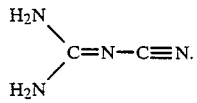

6. A polyurethane foam as claimed in claim 1, characterized in that said fire retardant comprises a content of free urea of at most 15%.

7. A polyurethane foam as claimed in claim 1, characterized in that the content of fire retardant comprises 10-100 parts by weight per 100 parts by weight of polyol.

8. A polyurethane foam as claimed in claim 1, which further comprises between 0 and 50 parts by weight with respect to 100 parts by weight polyol of at least one of the following fire retardants:
   a halogenated organic phosphate or phosphonate;
   an organic halogen free phosphate or phosphonate;
   a phosphorous free aliphatic halogen compound;
   an alicyclical or aromatic halogenated compound;
   antimony oxide and/or zinc borate in synergistic combination with a fire retardant comprising halogen;
   an inorganic fire retardant;
   an organic nitrogen compound, different from urea or said urea-formol oligomer.

9. A polyurethane foam as claimed in claim 1, characterized in that it comprises beside said linear urea-formol oligomer mixture 10 to 50 parts by weight melamine per 100 parts by weight of polyol.

10. A polyurethane foam as claimed in claim 1, characterized in that said isocyanate comprises toluene diisocyanate, 4,4'-diphenylmethanediisocyanate and/or chemically modified derivates thereof.

11. A polyurethane foam as claimed in claim 1, characterized in that the NCO index of the isocyanate varies between 80 and 120.

12. A polyurethane foam as claimed in claim 1, characterized in that it comprises at least one tertiary amine as a catalytic agent.

13. A polyurethane foam as claimed in claim 1, characterized in that it comprises at least one organo-metal compound as a catalyst agent.

14. A method for preparing a polyurethane foam as claimed in claim 1, by a reaction of isocyanate and/or a chemically modified derivate thereof with a high molecular weight reactive polyol, in the presence of a catalytic agent, a cross-linker, and/or an extender, water as a blowing agent and a fire retardant, characterized in that use is made of a fire retardant which comprises at least one of the following components:
   (1) linear urea-formol oligomer mixture having the general formula $NH_2$-CO-NH-($CH_2$-NH-CO-NH)$_n$-$CH_2$-NH-CO-$NH_2$, wherein n can have the value of from 0 to 50;
   (2) urea in powdered form at least partially covered by a film of a less soluble material;
   (3) dicyandiamide having the general formula:

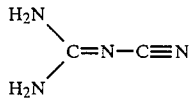

wherein said fire retardant is dispersed in powdered form with said polyol and whereby said polyol is afterwards brought into contact with other reaction components to form said polyurethane foam.

15. A method as claimed in claim 14, characterized in that the fire retardant is dispersed in powered form in said polyol before said polyol is brought into contact with the isocyanate and the other ingredients for forming said polurethane foam.

16. A polyurethane foam as claimed in claim 1, wherein said film of less soluble material is selected from the group consisting of sulfur and a resin.

17. A polyurethane foam as claimed in claim 4, wherein said film of less soluble material is selected from the group consisting of sulfur and a resin.

18. A polyurethane foam as claimed in claim 6, wherein said fire retardant comprises a content of free urea of at most 10%.

19. A polyurethane foam as claimed in claim 7 characterized in that the content of fire retardant comprises 20-100 parts by weight of polyol.

20. A polyurethane foam as claimed in claim 8 wherein:
said halogenated organic phosphate or phosphonate is selected from the group consisting of tris-(2-chloroethyl)-phosphate, tris-(dichloropropyl)phosphate, tris-(dibromopropyl)phosphate, and tratrakis-(2-chloroethyl)-ethylene-diphosphonate;
said organic halogen free phosphate or phosphonate is selected from the group consisting of tricrysyl phosphate and dimethyl phosphate;
said phosphorous free aliphatic halogen compound is selected from the group consisting of chlorine paraffin and polyvinyl chloride powder;
said alicyclical or aromatic halogenated compound is brominated, diphenyl oxide;
said inorganic fire retardant is an ammonium salt selected from the group consisting of ammonium phosphate, ammonium borate and ammonium sulfate or aluminum trihydrate; and
said organic compound different from urea or said urea-formol oligomer is selected from the group consisting of melamine and isobutylene diurea.

21. A polyurethane foam as claimed in claim 10, wherein said chemically modified derivatives are selected from the group consisting of a prepolymer, isocyanurate, biurete and carbodimide.

22. A polyurethane foam as claimed in claim 12, wherein said tertiary amine is selected from the group consisting of triethylene diamine, dimethylaminoethanol or bis-(2-methyl)-aminoethylether.

23. A polyurethane foam as claimed in claim 13 wherein said at least one organo-metal compound is selected from the group consisting of tin octoate and dibutyl tin dilaurate.

24. A method for preparing a polyurethane foam as claimed in claim 14 wherein said film of a less soluble material is selected from the group consisting of sulfur and a resin.

25. A method for preparing a polyurethane foam as claimed in claim 15 wherein said powder has a particle size of between 10 and 300 microns.

* * * * *